United States Patent
Chen et al.

(10) Patent No.: US 7,729,685 B1
(45) Date of Patent: Jun. 1, 2010

(54) PUSH-TO-TALK WIRELESS COMMUNICATION FOR PREPAID MOBILE SUBSCRIBERS

(75) Inventors: Ben-Ren Chen, Northboro, MA (US); Robert Martin Ephraim, Bridgewater, NJ (US)

(73) Assignee: Cello Partnership, Basking Ridge, NJ (US)

( * ) Notice: Subject to any disclaimer, the term of this patent is extended or adjusted under 35 U.S.C. 154(b) by 541 days.

(21) Appl. No.: 11/878,026

(22) Filed: Jul. 20, 2007

(51) Int. Cl.
*H04M 11/00* (2006.01)

(52) U.S. Cl. ...................................... 455/406; 455/518

(58) Field of Classification Search .................. 455/518, 455/519, 406, 432.1
See application file for complete search history.

(56) References Cited

U.S. PATENT DOCUMENTS

| | | |
|---|---|---|
| 6,496,690 B1 | 12/2002 | Cobo et al. |
| 7,545,761 B1 * | 6/2009 | Kalbag ........................ 370/310 |
| 2003/0216147 A1 | 11/2003 | Morin et al. |
| 2004/0077332 A1 | 4/2004 | Ephraim et al. |
| 2004/0196826 A1 | 10/2004 | Bao et al. |

OTHER PUBLICATIONS

"Push to talk" retrieved from: http://en.wikipedia.org/wiki/Push_to_talk on Jul. 7, 2006, Wikipedia.

\* cited by examiner

*Primary Examiner*—Tu X Nguyen
(74) *Attorney, Agent, or Firm*—McDermott Will & Emery LLP (57) ABSTRACT

Prepaid PTT service calls through a switched mobile communication network may originate at off-net roaming locations. A flag is set in a mobile telephone station indicating that the mobile station is that of a prepaid subscriber, to set a PTT client program to its "prepaid mode." When the prepaid mobile station initiates a PTT call while roaming off-net, the call is directed to a prepaid server, and the PTT client program assists the subscriber to re-enter the called number when the prepaid server prompts the subscriber to do so. The call can then be extended from the prepaid server platform to a PTT switch for establishing communication with one or more selected contacts in a contact list, based on translation of the contact number to one or more destination telephone numbers for the called contact(s).

39 Claims, 4 Drawing Sheets

PUSH-TO-TALK WIRELESS COMMUNICATION FOR PREPAID MOBILE SUBSCRIBERS

TECHNICAL FIELD

The present subject matter relates to techniques, equipment and programming to facilitate set-up of a push-to-talk (PTT) communication session for a roaming mobile station of a prepaid subscriber, for example through a voice-switched mobile communication network.

BACKGROUND

Traditional push-to-talk (PTT) communication utilized two or more radio transceiver stations, all tuned to the same channel. When not transmitting, the transceivers received any signal carried over the channel and supplied any received audio to the users. A user wishing to speak pushed a button, which caused that user's transceiver to broadcast audio over the common channel to the other transceiver(s) that shared the channel. Modern public cellular communication systems have evolved in recent years to offer a wide range of voice and data communications services. Many such services emulate traditional voice telephone services offered originally by the public switched telephone network, but the cellular implementation enhances the services with high degree of mobility. In recent years, it has become popular for cellular communication service providers to offer a PTT service to their customers.

The service providers and their equipment vendors have developed a number of different implementations for supporting PTT through wireless mobile networks. Discussion here focuses on implementations of PTT that utilize voice-switched calls through mobile switching centers of a cellular network. In support of such a PTT service implementation, the carrier deploys a switch referred to as a PTT service specific switch (PTT SSS). Voice calls between the PTT service's subscribers are routed through the PTT SSS, which controls the advanced PTT features and differentiates the PTT service from ordinary voice telephone service through the cellular network. As discussed below, problems arising in handling of PTT call for roaming prepaid subscribers. It may be helpful to consider PTT routing and network handling of prepaid calls in some detail, to understand the problems.

For subscribers roaming "off-net" (i.e. receiving service from an MSC belonging to one of the carrier roaming partners), PTT call routing may rely on the use of a mobile station resident PTT client program that stores a centrally administered contact list. Typically, a PTT subscriber places a PTT call by selecting a name corresponding to a contact from the list stored in the subscriber's mobile station, and the resident PTT client program causes this station to place the PTT call. The names corresponding to the contact list may be the names of other PTT users, the names of predefined groups of other PTT users, or a mixture of both. The PTT call goes through the mobile communication network to the PTT SSS.

Even when the selected contact is an individual subscriber, rather than a group, the actual number stored in the contact list for that contact is an alias numbers rather than the actual phone number of the contact, since PTT calls must be routed to the PTT SSS rather than to the called contact's Home MSC. While the subscriber identifies contacts by their names and actual corresponding telephone numbers for establishment of the contact in the system, the alias numbers are managed and translated through the PTT SSS. The alias numbers for the contacts on the subscriber's list are downloaded into the PTT client program in the mobile station, and the PTT client uses one of those alias numbers to make each PTT call. The alias numbers are limited in extent, the same alias numbers being assigned to a plurality of subscribers and may translate to different contacts for each of that plurality of subscribers. A table is maintained at the PTT SSS that correlates the alias numbers with the actual phone numbers, for each subscribing mobile station contact list. The alias numbers in the contact lists are subject to change, thus requiring the contact lists to be centrally administered in order to maintain correlation between the subscriber's named contacts and their phone numbers. Updated contact lists are downloaded to the mobile station resident clients when the updates occur. Because of the use of the contact list and aliases, the user typically does not know the number that the PTT client program uses to initiate a PTT communication and may not even remember the actual telephone number of the other party or parties.

For postpay subscribers there is no issue of concern, however, the use of the contact list and aliases raises concerns for prepaid operations, particularly when a prepaid mobile station is roaming off-net. A brief review of prepaid service may help to establish context for further discussion of PTT.

Many providers offering communication services through wireless mobile communication networks offer many of the services on a prepaid basis. As prepaid subscriptions to wireless communications services have become increasingly popular, prepaid availability has been extended to PTT service. Prepaid subscriptions are beneficial both to subscribers and the providers. The customer can budget an amount of airtime that will be used during a certain period of time to insure that the limited cost will not be exceeded. The wireless service provider receives payment in advance and avoids the risk that the customer will default on a bill that can occur with a postpay arrangement.

Conventionally, the prepaid wireless service customer purchases blocks of time for making voice telephone calls via a cellular telephone network. Upon connecting to the wireless communications network, the customer account is authorized and authenticated, and the network allows a call to proceed. The network monitors the customer's usage time and decrements from the customer's account. If the account becomes depleted, the system can either prompt the customer to purchase more time, or the system can terminate the call.

Prepaid network services offered by wireless carriers rely on intelligent network triggers to provide access to the carrier's prepaid server when a call is initiated to a called destination. The carrier's prepaid server times and rates a call originating from a location in the carrier's network, and the prepaid server deducts appropriate charges from the subscriber's prepaid account. The prepaid server can block or disconnect such a call if the subscriber is out of funds.

However, the use of intelligent network triggers or carrier specific techniques are not applicable when the prepaid subscriber is roaming "off-net." For this reason, prepaid services rely on "hotlining" of calls originated by a prepaid subscriber roaming off-net to the home carrier's prepaid server. The serving off-net mobile switching center (MSC) that provides service to the roaming subscriber replaces the telephone number dialed by the subscriber with a number for the prepaid server, which was received by the serving MSC from the subscriber's home location register (HLR) when the roaming subscriber's mobile station registered with the serving MSC. Consequently, before a prepaid call can be completed successfully to the intended destination, the prepaid server must prompt the roaming subscriber to reenter the called number in order to extend the call further. With the destination number, the prepaid server can pass the call to a network switch for routing to the desired destination. The home carrier's prepaid server can then time, rate and control the call, which is forwarded for completion to the called destination. However, such processing of prepaid calls for roaming subscribers raises issues with regard to routing of voice calls for PTT type service based on contact lists and aliases.

With the "hotlining" of PTT calls originated to the prepaid platform when the subscriber is roaming "off-net," the originally transmitted contact number information (alias) is replaced with the prepaid server number when the call is routed from the visited area MSC to the prepaid server. When the prepaid server prompts the roaming subscriber to reenter the destination number in order to extend the call further, the PTT customer is not likely to be able to readily respond to the reentry prompt in the context of a PTT call. Even if the selected contact is a single individual and the subscriber knows that contact's phone number, user input of that phone number would not properly direct the PTT call the PTT SSS. The PTT call thus would fail if the subscriber cannot reenter the correct PTT alias number.

As a result, carriers introducing voice call-based PTT services face a choice of either only offering PTT service to postpay type subscribers, or offering their prepaid subscribers a limited version of the PTT service that only allows prepaid subscribers to originate PTT calls when they are on-net. Neither of these options is commercially attractive.

Hence a need exists for a prepaid PTT service that can be implemented effectively for mobile calls that originate at roaming as well as on-net locations. Such a service should eliminate incompatibility between the roaming design of the voice call-based PTT services and the roaming design of the prepaid services being offered by many wireless carriers. System enhancements should avoid imposition of specially designed PTT handsets for prepaid subscribers, thereby enabling a wireless carrier to maintain only a single inventory of PTT handsets.

SUMMARY

The teachings herein alleviate one or more of the above noted problems with PTT services provided via a mobile communication network. PTT client programming in a mobile station is selectively configurable to operate in either a prepaid mode or a postpay mode. Operation(s) in the prepaid mode differ for a roaming mobile station operation(s) in the postpay mode, e.g. to support the prompt responsive communication of contact number information to the prepaid server when the roaming subscriber has a prepaid service.

For example, when a PTT call is generated at a roaming PTT mobile station operating in prepaid mode and the call is directed to a prepaid server platform, the MS resident PTT client program in the mobile telephone station assists the subscriber to transmit the alias number for the called contact to the prepaid server platform in response to the prompt from the prepaid server platform requesting the subscriber to reenter the called number. The call can then be extended from the prepaid server platform to a PTT switch for establishing communication with one or more selected contacts in the contact list. The PTT switch will translate the called contact number to destination telephone number information for the called contact(s) by accessing a contact list associated with the calling station subscriber.

The contact list may contain one or more alphanumeric aliases representing corresponding individuals or groups. The mobile station may be configured to display the user's contact list and to initiate the call in response to selection of a contact from the list. Several different mechanisms may be implemented to assist the subscriber in providing the contact's alias number information in response to the prompt from the prepaid server platform. In one example, the mobile station client displays a softkey and automatically sends the contact number information to the prepaid server platform upon activation of the softkey by the user (based on the user selection of a contact prior to initiation of the call). In another example, the mobile station displays the alias number of the contact, the user views the display and manually re-inputs the number, and the mobile station transmits the input number to the prepaid server platform. In either case, the alias number of the contact is sent to the prepaid server platform as DTMF digits. The disclosed example also supports sending calling station or calling user information to the PTT SSS using similar softkey or display and user input type techniques.

To support these operations, without the need to deploy different handsets or programming for prepaid and postpay subscribers, the PTT client program is selectably configurable to implement the communications for PTT calls in a prepaid mode and a postpay mode. At least one operation of the mobile station in relation to communication via the network for a PTT call, when the mobile station is roaming, differs between the prepaid mode and the postpay mode. For example, the prepaid mode will support certain communications with a prepaid server when the mobile station is roaming as outlined above. In the examples, the PTT client program is configured by setting the appropriate state of a flag, to indicate whether or operate in the prepaid mode or postpay mode. The flag can be set in response to a command received via the mobile communication network, e.g. based on the type of service subscription of the subscriber/user of the particular PTT mobile station.

The methodology as outlined above may be implemented as appropriate mobile station programming typically in the form of a mobile station resident PTT client. Additional related enhancements may be implemented in the PTT service specific switch, in the PTT Management Platform, and in signaling interfaces between the various PTT elements. The enhancements to the network platforms and signaling interfaces allow the carrier to offer a prepaid PTT service that extends to roaming subscribers yet avoids the maintenance of separate inventories of prepaid PTT mobile stations and postpaid PTT mobile stations.

The present teachings are easily adaptable to resolve incompatibilities between prepaid roaming design and the roaming design of other, non-PTT, services that rely on a centrally administered, service specific, MS resident contact list. Similarly, the disclosed techniques are easily adaptable to resolve incompatibilities between other services that hotline "off-net" roamers and the roaming design of PTT or of any other service that relies on a centrally administered, service specific, MS resident contact list.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various techniques and elements disclosed herein relate to push-to-talk (PTT) communication for a roaming mobile station of a prepaid subscriber. Prepaid PTT service calls through a voice switched type mobile communication network may originate at roaming locations. When the prepaid mobile station initiates a PTT call, if the station is at a roaming off-net location, the call is directed to a prepaid server. When the prepaid server prompts the subscriber for the destination number in the same way as for other calls from a roaming prepaid mobile station, the resident PTT client program assists the subscriber to provide the contact's alias number to the prepaid server. The call can then be extended from the prepaid server platform to a PTT switch for establishing communication with one or more selected contacts in a contact list, based on translation of the contact alias number to one or more destination telephone numbers for the called contact(s).

To support these operations, without the need to deploy different handsets or programming for prepaid and postpay subscribers, the PTT client program is selectably configurable to implement the communications for PTT calls in a prepaid mode and a postpay mode. In the examples, the PTT client program is configured by setting the appropriate state of a flag, to indicate whether or operate in the prepaid mode or postpay mode. The flag can be set in response to a command received via the mobile communication network, e.g. based on the type of service subscription of the subscriber/user of the particular PTT mobile station. Operation of the mobile station in relation to communication via the network for a PTT call, when the mobile station is roaming, differs between the prepaid mode and the postpay mode. For example, the prepaid mode will support the prompt responsive communications of contact alias number information to the prepaid server when the mobile station is roaming as outlined above.

Reference now is made in detail to the examples illustrated in the accompanying drawings and discussed below. Before discussion the details of the PTT communication for the roaming mobile station of the prepaid subscriber, it may help some readers to consider the wireless context of such communications. Hence, we will initially provide a discussion of the networks and relevant elements thereof as may be involved in the PTT communications for prepaid customers.

Figure 1:
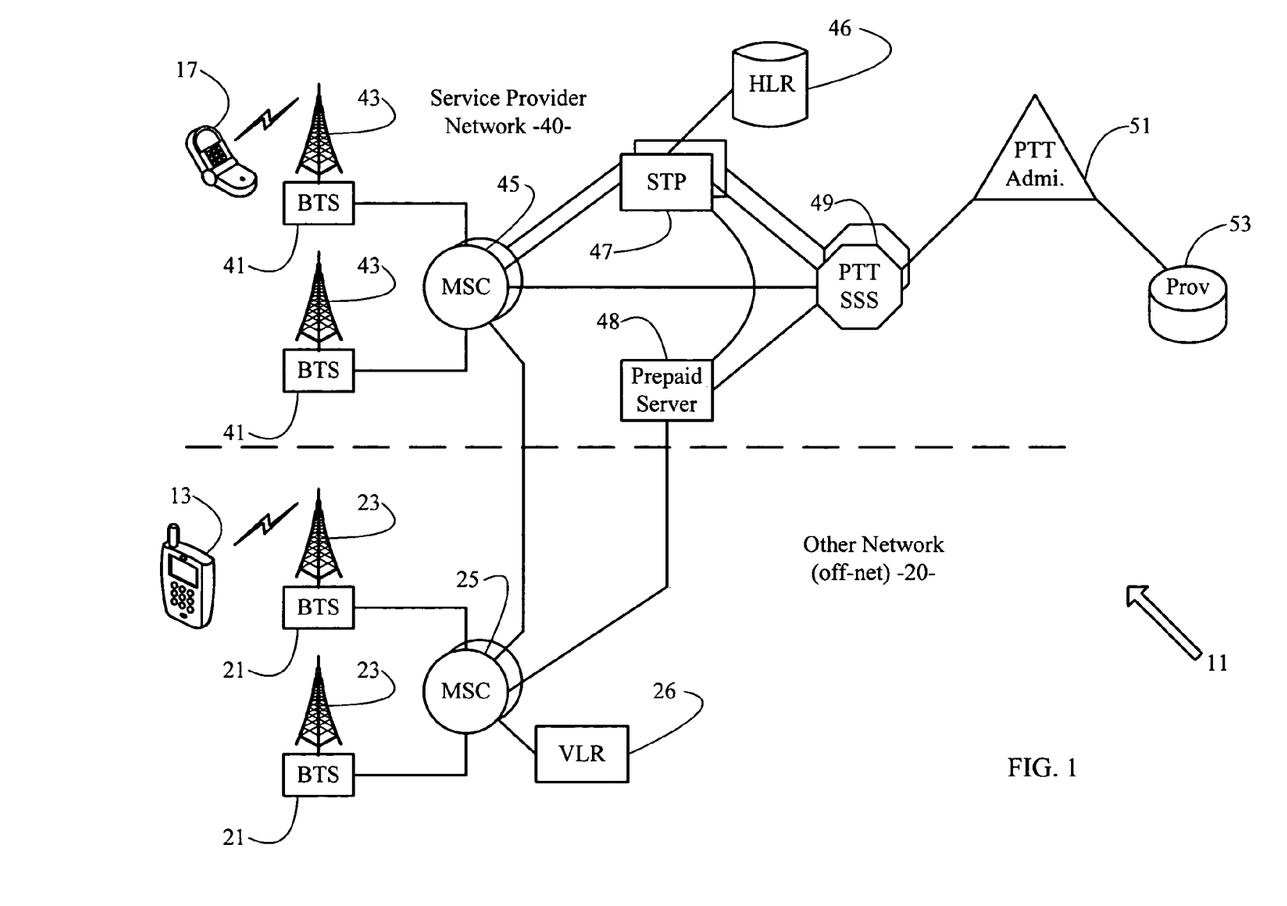
FIG. 1 is a simplified functional block diagram of a mobile wireless communication network supporting prepaid PTT service, including such service for roaming subscribers.

FIG. 1 is a functional block diagram of a mobile communication network 11 that includes wireless radio access networks 20 and 40 for providing mobile voice telephone services, including PTT service, to mobile station mobile telephone stations, two of which are shown by way of example at 13 and 17 each operated by a different user. The stations represent the general class of mobile stations that operate via public cellular networks or the like. The communication networks 20 and 40 provide mobile communications for numerous mobile stations. Although the networks may offer packet data services, discussions here will focus on mobile voice telephone services using circuit switched capabilities of the network 11, including those for PTT.

The network 11 enables users of the mobile stations 13, 17 to initiate and receive telephone calls to each other as well as through the public switched telephone network or "PSTN." As the discussions here focus on PTT communication, the PSTN and associated landline telephone devices have been omitted from the drawing. The network 11 may comprise access networks operated by a number of separate and independent service providers or "carriers." For discussion purposes, the drawing shows two such carrier networks, 20 and 40, which we will assume are operated by two different carriers. For purposes of examples, the subscribers associated with mobile stations 13 and 17 are assumed to subscribe to services offered by the carrier or service provider operating network 40, whereas the network 20 is operated by another party. Hence, in the drawing, the mobile station 17 is currently operating "on-net" through the service provider's network 40, whereas the mobile station 13 is operating "off-net" through the other network 20. Stations of other carriers' subscribers are omitted for simplicity. Those skilled in the art will recognize that large carriers operate a number of such networks 20, 40 and that many countries have more than two mobile carriers that offer mobile communication services. Through the carriers' networks 20 and 40, the overall network 11 offers public mobile communications to customers using mobile stations such as 13 and 17 throughout a wide geographic area.

Physical elements of a network 20, operated by one of the other carriers, include a number of base stations represented in the example by the base transceiver systems (BTS) 21, each of which communicates via an antennae system 23 at the site of the respective base station and thus over the air-link with one or more of the mobile stations, when the mobile stations are within range. Each base station typically includes a BTS 21 coupled to several antennae mounted on a radio tower within a coverage area often referred to as a "cell." The BTS 21 is the part of the radio network that sends and receives RF signals to/from the mobile stations that the base station currently serves.

A typical current example of the network 20 also includes a number of radio access network switches 25. The switches typically are modern versions of mobile switching centers (MSCs) or Mobile Telephone Switching Offices (MTSOs), which support both cellular voice and packet data services. Each MSC switch 25 connects through trunk circuits to a number of the BTS base station transceivers 21, which the respective switch serves and controls. The MSC switches 25 provide voice service switching, for example, for calls between mobile stations via interconnecting trunks and via the PSTN network for calls to and from landline telephones.

The BTS 21 at a base station assigns and reassigns channels to the mobile stations that it serves, and the BTS 21 monitors the signal levels to recommend hand-offs to other base stations. The network 20 typically includes a base station controller (BSC) functionality (not shown) that controls the functions of a number of base stations and helps to manage how calls made by each mobile station are transferred (or "handed-off") from one serving base station to another. Each wireless network equipment vender implements this function differently. Some vendors have a physical entity, which they call a BSC, while other vendors include this functionality as part of their MSC switch 25.

Although different radio access networks may utilize different technologies or architectures, for discussion purposes it is assumed that the network 40 is generally similar to the network 20. Like the network 20, the physical elements of the network 40, include a number of base stations represented in the example by the base transceiver system (BTS) 41. Each BTS 41 communicates via an antennae system 43 at the site of base station and thus over the air-link with one or more of the mobile stations, when the mobile stations are within range.

The base station transceivers (BTSs) 21, 41 provide two-way communication over the air to mobile stations 13 and 17. The principles under discussion here are applicable to a wide range of different types of wireless communications networks. In the examples, air-link communications between the base stations and the mobile stations utilize code-division multiple access (CDMA) type spread spectrum communications. For example, the system might operate in accord with the IS-95 standard, or a next generation wireless network implementation of CDMA. The principles also may be implemented in other cellular communications networks, for example, based on TDMA or GSM standards or even those still utilizing legacy analog standards such as AMPs.

The network 40 also includes a number of radio access network switches 45. The switches 45 typically are modern versions of mobile switching centers (MSCs) or Mobile Telephone Switching Offices (MTSOs), which support both cellular voice and packet data services, the same as or similar to the MSC switches 25 discussed earlier. Each MSC 45 connects through trunk circuits to a number of the BTS base station transceivers 41, which the respective switch serves and controls. The MSC switches 45 provide voice service switching, for example, for calls between mobile stations 17 via interconnecting trunks and calls to and from landline telephones 33 via the PSTN network 31. The MSC switches 45 also provide voice service switching via trunks to one or more MSCs 25 in the other carrier's wireless network 20 for communications with mobile stations 13 currently operating through the other wireless network 20.

The network 40 also includes one or more signal transfer points (STPs) 47, typically deployed as mated pairs of STPs, coupled to the MSC switching offices 45 of the network 40 and to elements of the PSTN through signaling system no. 7 (SS7) link sets. The STPs and the links thereto provide a signaling network, for use in managing call traffic through the telecommunications network 40. Although omitted for simplicity of illustration, the network 20 typically includes one or more signal transfer points linked to its MSCs 25 as well as to the STPs 47 of the network 40.

For wireless services, the mobile stations are provisioned to normally operate in the serving area of one wireless system operated by the user s access service provider that is to say one of the carriers. In the example, service provider operating the network 40 is the home carrier for exemplary stations 13 and 17, therefore the wireless network 40 is the "home" location or system for those mobile stations. For voice communication services, most implementations of the wireless network 40 include a Home Location Register (HLR) 46, which stores data regarding the valid stations' identifications, the assigned telephone numbers, subscription service options, terminal capabilities, etc. The home network 40 uses the service information from the HLR 46 to provide the subscribed services to each user's mobile station, for example, while the station 17 is operating in the service area of the home network 40.

Although the HLR 46 may reside in an MSC or other switch, today, the HLR 46 may run as an application/database on a separate computer coupled for SS7 type packet signaling communication via the STPs 47. In some networks, the computer or server providing the HLR functionality is referred to as a Service Control Point (SCP). Of course, there may be multiple computers distributed throughout the network 40 for performing the HLR function. In some implementations, the SCP functionality is incorporated into an MSC or into a switch or router of the packet network providing the SS7 signaling communications. Other implementations provide packet communications to/from the element serving as the HLR via IP networking.

As a customer roams, a mobile station such as station 13 registers in service areas other than the home area of network 40, such as the network 20 in our example. To facilitate roaming and attendant registration, each network also implements a Visitor Location Register (VLR), such as the VLR 26 in the other service provider's network 20. VLRs typically reside in the MSCs 25, although the function may be implemented in other network nodes. The VLR 26 and the HLR 46 interact to validate the roaming mobile station 13. For a validated station 13, service information for that station is downloaded from the HLR 46 to the VLR 26 in a visited access network 20 during a successful registration process. The validation process also provides information to the HLR 46 indicating the current location of the station 13 in this case, within the network 40, to allow the network 40 to route incoming voice calls to the station 13 at its current location. Although the links are omitted for simplicity, VLR-HLR communications typically utilize SS7 signaling via one or more STPs.

Many of the services offered through the network 11 are offered on a traditional postpay basis. The programming of the mobile stations, including the PTT client programming, will cause stations of postpay subscribers to operate in the normal ways for the applicable services including the PTT service communications. However, some services are offered on a prepaid basis. For example, a subscriber may purchase 1000 minutes of phone call air time. A carrier or a third party service provider will operate a server 48, to support offering of various services on a prepaid basis. The prepaid server 48 manages customers' prepaid accounts. As discussed more later, the PTT client program may be configured to operate a different manner for prepaid subscribers, particularly during roaming. One or more such differences relate to certain communications with the prepaid server 44 and/or a PTT SSS 49. An example of a suitable prepaid platform is the SurePay® from Lucent Technologies. The SurePay® platform typically connects to one or more of the MSC switches 25 or 45 and/or to the SS7 signaling links going to/from the STPs 47. Those skilled in that art will recognize that other platforms may be used, including generic platforms programmed to operate as a secure database server coupled to an IP network.

For normal voice telephone calls, the prepaid server 48 interacts with switches 25, 45 of the networks 20, 40 and/or with network nodes 46, 26 providing home location register (HLR) and/or visitor location register (VLR) functions to provide prepaid accounting and management of account related information for controlling such calls, in a manner well known in the art. As outlined in the background, the prepaid server also supports prepaid billing treatment for PTT communications for mobile stations 17 operating on-net (within network 40). The operations for prepaid treatment for PTT communications for mobile stations 13 operating off-net (e.g. via network 20) will be discussed in detail, later.

The prepaid services offered by wireless carriers are often designed to take advantage of intelligent network triggers (e.g., WIN triggers or CAMEL triggers) to signal the carrier's prepaid server(s) 48 for an on-net call. This intelligent network type processing providers the server 48 visibility of the start and end of a prepaid calls, so that when a prepaid subscriber originates a call while "on-net," a prepaid server can time and rate the call, and apply the appropriate charges to the subscribers account. The server 48 also controls the prepaid calls, so that the prepaid server can block or disconnect such calls if the subscriber is out of funds.

Alternately, these prepaid services may rely on the use of carrier specific techniques including proprietary protocol enhancements and complex translations in place of intelligent network triggers.

However, the use of intelligent network triggers or carrier specific techniques cannot be relied on when the prepaid subscriber is roaming "off-net." For this reason, the design of these services generally requires that calls originated by a prepaid subscriber roaming "off-net," e.g. from mobile station 13 visiting network 20, to be "hotlined" to a prepaid server 48 (either directly or via an associated MSC which relays the call to the prepaid server 48). When a prepaid subscriber roaming "off-net" originates a call, the Serving MSC 25 (i.e., the MSC providing service to that subscriber) replaces the telephone number dialed by the subscriber with the "hotline number," received by the Serving MSC from the subscriber's HLR 46 when the Serving MSC "registered" the subscriber. The use of this hotline number causes the call to be routed to the home carrier's prepaid server 48, so the prepaid server can time, rate, control the call, and apply the appropriate charges to the subscribers account. This technique applies to calls for roaming subscribers, for regular telephone service as well as for PTT service.

To appreciate the impact of prepaid processing on PTT, it may be helpful first to consider the implementation of voice switched PTT in somewhat more detail. The illustrated network 11 utilizes voice-switched calls through the MSCs of the cellular network to provide the PTT service. In support of the PTT service, however, the service provider also deploys one or more switches 49, each referred to as a PTT service specific switch (PTT SSS). Voice calls between the PTT service's subscribers are routed through the PTT SSS, which controls the advanced PTT features and differentiates the PTT service from ordinary voice telephone service through the cellular type mobile communication network 11. Although not required, in some implementations, one of the PTT SSS 49 may be configured as a dedicated gateway for calls for roaming PTT mobile stations 13.

The service provider offering the PTT service operates a PTT administration system 51, to program necessary operating data and the like into the PTT SSS switches 49. For example, the PTT SSS uses a table to translate aliases used in various contact lists into destination numbers of mobile stations 13, 17 or other PTT destination terminals, for PTT call routing. The alias numbers in the contact lists are subject to change, thus requiring the contact lists to be centrally administered, via system 51 in the example, in order to maintain correlation between the subscriber's named contacts and their phone numbers. Updated contact lists are downloaded to the mobile station resident clients. As discussed more later, the PTT administration system 51 and/or the PTT SSS 49 also provide mechanisms and interfaces that support configuration of the PTT client programs in the PTT mobile stations 13 and 17, e.g. to set the flags of stations of prepaid subscribers so as to causes those stations to operate in the prepaid mode.

The service provider also operates one or more provisioning systems, represented generally by the system 53. The provisioning system 53 loads data into network elements and into mobile stations 13 and 17 of service subscribers, to allow the mobile stations to operate and be homed on the network 40 and to provide services for those stations in accord with each respective customer's subscription. The provisioning system 53 similarly provides provisioning instructions/data to the PTT administration system 51, including information indicating whether PTT subscribers are prepaid subscribers or postpay subscribers.

To provide for processing PTT calls for roaming mobile stations of prepaid service customers, a "prepaid flag" is provided in the PTT client, resident in the mobile station, e.g. in the station 13. A similar flag is also set in the PTT SSS switch 49. When a subscriber signs up for prepaid service, the "prepaid flag" is set in the carrier's provisioning system 53 to reflect the status of the subscriber as postpay or prepaid. This flag flows, by appropriate messaging, through the carrier's provisioning system 53 to the PTT administration system 51, the PTT SSS switch 49, and finally to the subscriber's resident PTT client in the mobile station 13.

The PTT call routing relies on the use of a mobile station resident PTT client program that stores a centrally administered contact list. The names on this contact list typically are names of other PTT users, the names of predefined groups of other PTT users, or a mixture of both. The subscriber selects the name of the contact (whether an individual PTT user or a predefined group of PTT users) to be called. However, it is the mobile station resident PTT client program in the mobile station that actually places the call. The client places the call to the PTT SSS using the number that has been associated to the client by this contact list update. Normally, when the call is routed to the PTT SSS 49 determined by the contact number used by the PTT client program, the PTT SSS uses the called contact number in combination with the received Caller ID to identify the actual destination number of the contact selected by the PTT subscriber.

If the prepaid flag is set to indicate that a subscriber is a postpay customer, the mobile station resident client operates in normal fashion (since there is no need to offer the subscriber assistance in reentering the called number); calls are processed by the network using the number provided by the mobile station client as dialed number and are directed to the PTT SSS 49 by the serving MSC 25 or 45. If the prepaid flag is set to indicate that the subscriber is prepaid, but the mobile station is not in a roaming (i.e., off-net) location, the mobile station resident client program also operates in normal fashion, as the carrier's intelligent network signaling provides for prepaid PTT processing. However, if the prepaid flag is set to indicate that the subscriber is prepaid, and the mobile station such as 13 is located in a roaming (off-net) location, e.g. in network 20 in our example, the mobile station resident PTT client program operates the mobile station in a modified manner. In the examples, the resident PTT client program assists the subscriber in re-transmitting the contact number information when prompted to do so by the prepaid server 48, and the resident PTT client program may also assist the subscriber in sending caller or mobile station identifying information to the PTT SSS 49.

By way of a more specific example, the station 13 is that of a roaming subscriber and is operating off-net. As outlined above, prepaid services offered by the carriers are designed to rely on "hotlining" all calls originated by a prepaid subscriber to the prepaid platform 48, when the subscriber is roaming "off-net." Hence, when the MS resident PTT client program causes the mobile station 13 to place the call through the appropriate base station and the MSC 25 in the visited network 20, the MSC 25 uses the number obtained from the HLR 46 to route the call to the prepaid platform 48. The platform 48 performs the appropriate prepaid accounting, e.g. to confirm that there are sufficient minutes or funds available in the subscriber's account. If not, then the call is terminated. However, if the account check is successful, the prepaid server 48 allows call processing to go forward, and the server 48 sends back a prompt for reentry of the called number so that the prepaid server can route the call to the desired destination.

In this situation, the number reentered as called number actually should be the relevant contact's alias number from the PTT contact list, but as previously noted, the subscriber would not be aware of this number. The PTT client program (with the flag set to prepaid) would provide assistance to the user for sending the appropriate contact number information back to the prepaid server 48. Specific examples of how this assistance may be implemented, e.g. displaying a softkey whose selection would initiate transmission of the alias number as DTMF, or displaying the contact number so the subscriber can manually enter it, are discussed in more detail later. Upon receipt of the contact information, as the reentered called number, the prepaid platform 48 extends the call to one of the PTT SSS type switches 49.

The actual numbers for the stored contact list are alias numbers that represent the actual phone numbers of the contacts. While the subscriber identifies the names and actual corresponding telephone numbers for establishment in the system, the alias numbers are managed and translated through the PTT SSS 49. The alias numbers are limited in extent, the same alias numbers being assigned to a plurality of subscribers. A table is maintained at the PTT SSS 49 that correlates the alias numbers with the actual phone numbers for each subscribing mobile station contact list. Hence, when the call reaches the PTT SSS 49 from the prepaid platform 48, the PTT SSS 49 uses the calling station identification to retrieve the subscriber's table, and uses the table to translate the contact information into the appropriate destination number or numbers. The PTT SSS 49 initiates a call to the terminal associated with the resulting number, e.g. to the mobile station 17. If answered, the PTT SSS 49 manages the PTT features of the communications between the two (or more) parties.

It is assumed that those skilled in the art are familiar with the structure and operation of the mobile stations 13 and 17. The discussion herein focuses on operations of such stations for PTT communications, particularly in the context of a prepaid subscription. Certain aspects of the prepaid PTT communications are implemented in the mobile stations and software programming of such stations. Hence, to insure a full understanding by all readers, it may be helpful to consider a high level summary review of the relevant structure of an example of a mobile station such as the station 13.

Figure 2:
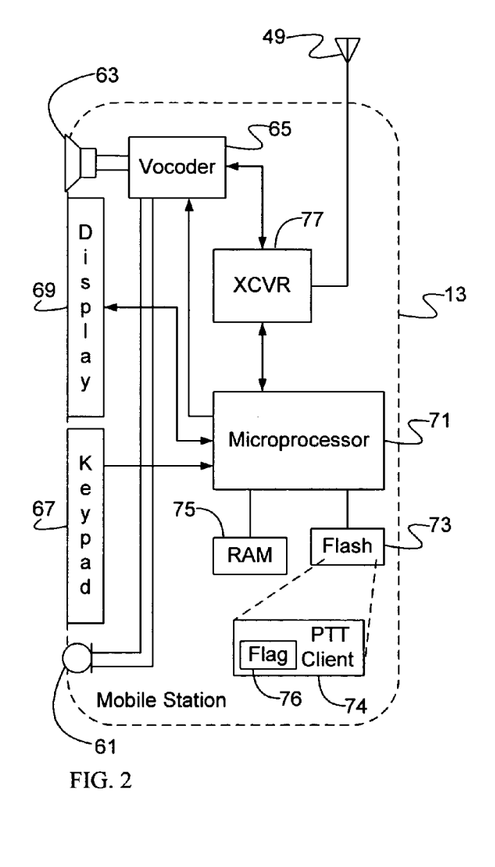
FIG. 2 is a functional block diagram of a mobile station that may obtain PTT service and/or other services on a prepaid basis through the network of FIG. 1.
Figure 3:
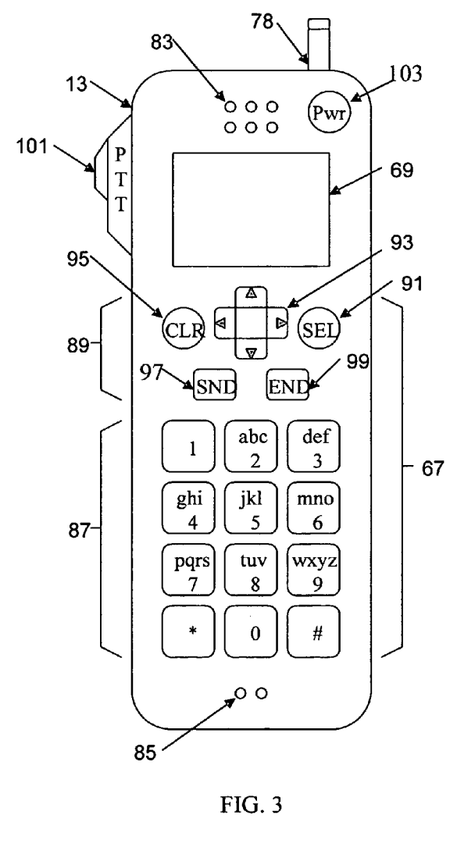
FIG. 3 is an exemplary front plan view of a mobile station, such as the station shown in functional diagram form in FIG. 2.

FIG. 2 is a functional block diagram, and FIG. 3 is in a plan view, illustrating a telephone implementation of a mobile station, in this case the station 13 although the station 17 may have a similar configuration. The handset embodiment of the mobile station 13 functions as a normal digital wireless telephone station. Hence, the station includes a microphone 61 for audio signal input and a speaker 63 for audio signal output. Microphone 61 and speaker 63 connect to voice coding and decoding circuitry (vocoder) 65. For PTT and other voice telephone calls, for example, the vocoder 65 provides two-way conversion between analog audio signals representing speech or other audio and digital samples at a compressed bit rate compatible with the digital protocol of the wireless telephone communications of network 11.

For digital wireless communications, the handset 13 also includes a digital transceiver (XCVR) 77. For example, the transceiver 77 could be a CDMA, TDMA or GSM unit, designed for cellular or PCS operation. Transceiver 77 provides two-way wireless communication of information, such as vocoded speech samples, although the transceiver may also provide communications for packetized digital message information. The transceiver also sends and receives a variety of signaling messages in support of the various services provided via the station 13 and the networks 20 and 40. Transceiver 77 connects through RF transmit and receive amplifiers (not separately shown) to an antenna 78. The station 13 may include one or more additional transceivers (not shown) for operation in an analog mode or in accordance with an alternative digital standard.

The digital telephone handset 13 includes display 69 for displaying messages, one or more menus or lists (e.g. a contact list for PTT) and/or softkeys generated by the resident programming, call related information, dialed and calling party numbers, etc. Keypad 67 enables dialing digits for voice and/or data calls and generating selection inputs keyed by the user based on any displayed menu. Of note for purposes of this discussion, the keypad 67 and the display 69 provide at least a portion of the user interface for PTT communications.

A microprocessor 71 serves as the programmable controller in that it controls all operations of the mobile station 13. The microprocessor 71 is a programmable device. The mobile station 13 also includes memory 73 coupled to the microprocessor 71, for example, a flash type read only memory (ROM), for storing various software programs and mobile configuration settings, such as mobile identification number (MIN), etc. for execution or processing by the microprocessor 71. A non-volatile random access memory (RAM) 75 serves as a working memory during execution of programs. The memories also store data, such as telephone numbers and other data input by the user via the keypad 67 as well as received data (e.g. messages) for display.

Program memory 73 stores an operating system, device driver software, call processing software, and the like. For the PTT service, the programming stored in the memory 73 will include a resident PTT client program 74, and execution of the client program 74 by the microprocessor 71 enables the mobile station 13 to implement various aspects of the PTT communications. The PTT client 74 also controls management and storage of the subscriber's contact list information in memory of the mobile station 13. In this example, the client software 74 is an application level program in the form of a micro-client specifically adapted for the circuit switched type PTT call processing. The PTT client program 74, for example, provides the intelligence for the user interface for PTT communications via the keypad 67 and the display 69, such as menu display and selection and/or softkey display and activation.

Of note for purposes of this discussion, the PTT client program 74 also implements a flag 76. The service provider sets the state of the flag 76, to indicate whether or not the station 13 is that of a prepaid subscriber. The flag setting configures the PTT client program 74 so that execution thereof by the controller (microprocessor) 71 will operate the station 13 in either the prepaid mode or the postpay mode, which are different at least when the station 13 is roaming. Although the service provider might use other mechanisms to set the state of the flag 76, in the examples, the flag is set in response to a command sent over-the-air, that is to say via the mobile communication network 11. When a subscriber signs up for prepaid service, the "prepaid flag" 76 is set in the carrier's provisioning system to reflect the status of the subscriber as postpay or prepaid. This flag flows, by appropriate messaging, through the carrier's provisioning system to the PTT management platform, the subscriber's home PTT server switch, and finally to the subscriber's resident PTT client in the mobile station. The flag may be reset, e.g. from prepaid to postpay or from postpay to prepaid, in a similar manner at any time, for example, when the subscriber changes subscription arrangements with the service provider.

FIG. 3 shows the front of the cellular mobile station 13, in the form of a portable handset. As shown, the handset housing includes openings 83 enabling sound to emerge from the speaker 63, as well as openings 85 to allow input of sound to the microphone 61. Also shown are the visible display screen 69 and various keys making up the keypad 67. The keypad 67 typically includes at least two sets of keys 87, 89. The keys 87 represent dialing-input keys. Typically, each of the twelve keys 87 is imprinted with a number from 1 to 0, an asterisk or star (*) or a number sign (#). Each of the keys 87 numbered 2 through 9 also is imprinted with three or four letters, to enable input of alphabetical information.

The keys 89 are function keys. The exemplary set of function keys include a menu scrolling key 93, a selection (SEL) key 91, a clear (CLR) entry key 95, a send (SND) key 97 and an END key 99. The send (SND) key 97 is used to initiate or answer a wireless call, and the "END" key 99 is used to terminate a wireless call. The mobile station 13 also includes a PTT key, used at various stages of PTT communications, e.g. to send a broadcast voice transmission to one or more other users participating in a PTT communication session via the PTT SSS 49. Power (Pwr) key 103 enables the user to toggle the handset 13 on and off.

The PTT client 74 provides the logic for responding to operation of PTT button 101. While logged-on for PTT communication, for example, the microprocessor 71 responds to depression of the PTT button 101 to transmit audio/speech to the PTT SSS 49 for distribution to other participant(s) in the PTT session. When the user releases the PTT button 101, the microprocessor 71 changes station operation over to a receive mode awaiting audio/speech from the PTT SSS 49.

The keypad 67 supplies user input information to the microprocessor 71, and the microprocessor provides digital data signals to cause the display 69 to show appropriate information to the user. Under control of the microprocessor 71, the display 69 shows textual information, such as name and/or other contact list information for the PTT communications. Hence, under control of the microprocessor 71 and its programming, the keypad 67 and the display 69 provide a user interface allowing the customer to input information and receive information, including information related to PTT call set-up.

For a PTT call, the mobile station resident PTT client program 74 enables the microprocessor 71 to generate a display of a contact list on the display 69. The names on the contact list may be names of other PTT users, names of predefined groups of other PTT users, or a mixture of both. Typically, a PTT subscriber places a PTT call by selecting a name from the contact list to call. In response, the resident PTT client program 74 actually places the call using the corresponding PTT alias number.

If the prepaid flag 76 is set to indicate that a subscriber is postpay, the mobile station resident PTT client program 74 operates in normal fashion (since there is no need to offer the subscriber assistance in reentering the called number); calls are directed toward the PTT platform by the serving switch using the number provided by the mobile station client as dialed number. If the prepaid flag is set to indicate that the subscriber is prepaid, but the mobile station is not in a roaming location, the mobile station resident client program 74 also operates in normal fashion, since the carrier's intelligent network signaling provides for routing of the prepaid PTT call toward the PTT platform.

If the prepaid flag 76 is set to indicate that the subscriber is prepaid, and the mobile station 13 is in a roaming (off-net) location, the mobile station resident PTT client program 74 operates in a modified manner. The resident PTT client program 74 assists the subscriber in re-entering the called number when the subscriber is prompted to do so by the prepaid server 48. For this purpose, the PTT resident client program 74 can function to implement any of several user-interface mechanisms. For example, the client program 74 may cause a menu item or soft key to be displayed to the user which, when selected by the user, would trigger the resident PTT client program 74 to send the alias number associated with the selected contact as DTMF digits to the prepaid server 48 without further subscriber involvement. Alternatively, the resident client program 74 may cause the station 13 to display the contact number so that the subscriber can manually re-enter the number for transmission.

For carriers that use mobile station resident PTT clients in which DTMF signals are used to provide calling station identity to the PTT SSS 49 at the start of an off-net call origination, the behavior of the client 74 may be further modified when the prepaid flag 76 is set to "prepaid." When a subscriber initiates a PTT call while roaming off-net, the client 74 will not signal its identity at the start of the PTT call. Instead, it will assist the subscriber in signaling its identity to the PTT SSS 49 after the subscriber's interaction with the prepaid server 48 is completed, and the prepaid server 48 has established a connection to the PTT SSS 49. This additional assistance may take any of several forms. The mechanism selected by the carrier may be dependent on the design of the prepaid service and the mechanism used by the PTT client to offer the subscriber assistance in re-entering the called number when prompted by the prepaid server. If the subscriber selects a menu item or soft key to trigger the re-entry, and if re-entry of the called number is always the last step in the interaction between the subscriber and the prepaid server 48, the resident mobile station PTT client program 74 may wait for a fixed duration after sending the called number to the prepaid server and then automatically send the identity of the station to the PTT SSS 49 without requiring further subscriber involvement. If the subscriber re-enters the PTT contact number manually, or if the interaction between the subscriber and the prepaid server may last for an unpredictable amount of time following re-entry of the PTT contact number, the mobile station resident PTT client program 74 may cause a menu item or softkey to be displayed to the user which, when selected, would trigger the client program to send the station identity as DTMF signals after a short client controlled delay. This case would allow the subscriber to complete the interaction with the prepaid server 48 before triggering the identity transmission, thus providing sufficient time for establishment of the connection from the prepaid server 48 to the PTT SSS 49 to take place. Correlation can then be made by the PTT SSS 49 between the calling station identity and the associated contact list in the PTT database. Alternatively, the mobile station resident PTT client program 74 may display the calling station number on the screen so that the subscriber can manually re-enter it.

The provision of the prepaid flag 76 not only provides for appropriate handling by the mobile station PTT client program 74 of roaming originated prepaid subscriber PTT calls, but also offers the advantage that the PTT client program 74 resident in any mobile station 13 or 17 can be provisioned for such operation by setting of the prepaid flag through network messaging. The carrier need not maintain multiple inventories of PTT mobile stations, one for sale to prepaid subscribers and one for sale to non-prepaid subscribers.

Although call processing has been outlined in general above, from the network and mobile station perspectives, it may be helpful to consider some specific examples in more detail.

Figure 4A:
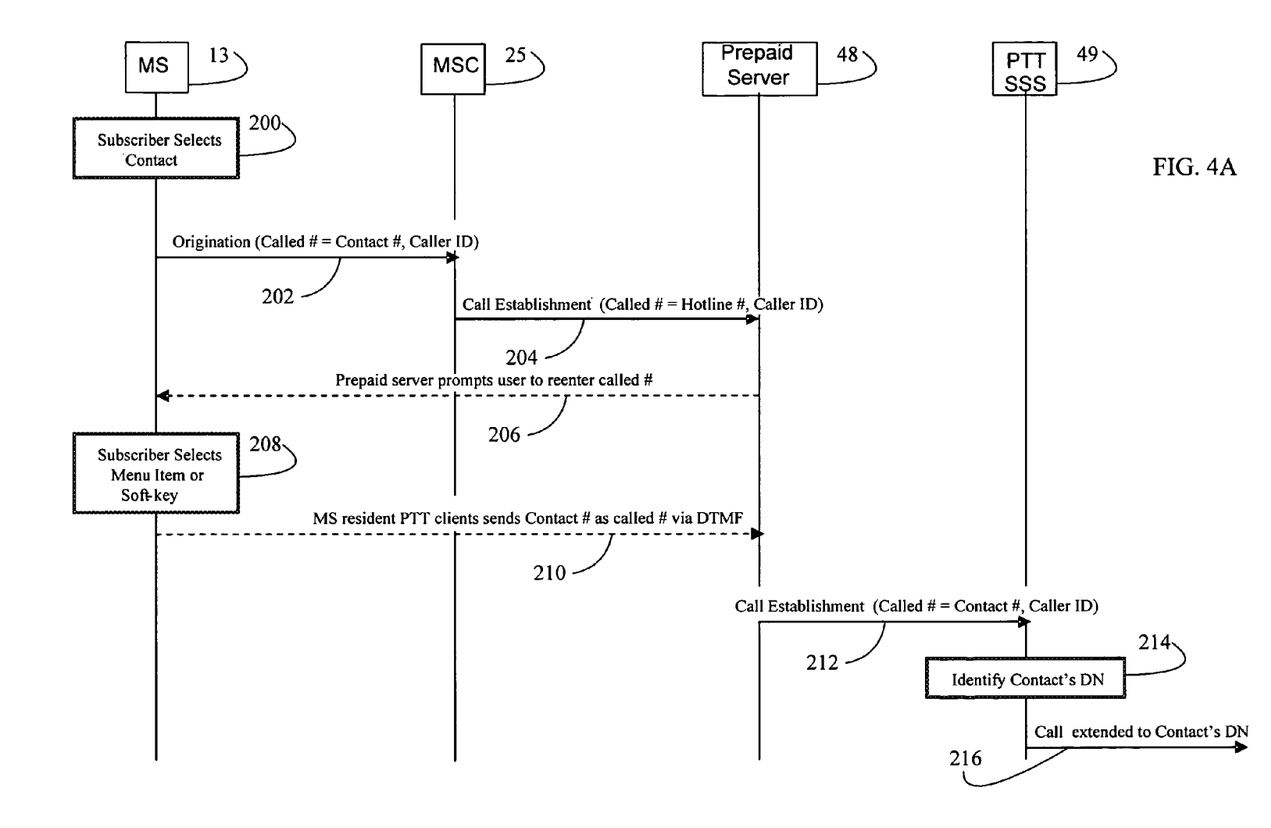
FIGS. 4A and 4B are signal flow diagrams illustrating exemplary processing for establishing PTT sessions for a roaming prepaid subscriber station.

FIG. 4A is a signal flow diagram of a process for establishing a PTT call originating from an off-net subscriber, using mobile station 13 for example, wherein the PTT SSS type switch 49 relies on caller ID signaling to identify the calling subscriber. At step 200, the user selects an entry from contact list displayed by the resident PTT client program 74 in response to actuation of the PTT button 101 on the mobile station 13. In response, the resident PTT client 74 originates a call, transmitting the contact number and the caller ID data to the serving MSC 25 at step 202. The serving MSC 25 recognizes that the call is being originated by a "hotlined subscriber" from information (including a "hotline number") downloaded into an assigned VLR 26 from the subscriber's record in the HLR 46, during registration.

In response to the recognition of the prepaid status of the mobile station 13, the MSC 25 uses the "hotline number" retrieved from the VLR to "hotline" the call to the home carrier's prepaid server 48, at step 204. For such routing, the originally dialed contact number is replaced with the prepaid server number (which is the "hotline number"), e.g. as supplied by the HLR 46 to the VLR at the time of registration of the mobile station 13 with the visited network MSC 25. When the call reaches the prepaid server 48, the server has the caller ID information for the mobile station 13 and can perform the appropriate prepaid accounting.

However, upon allowing the call to proceed (adequate prepaid amount remaining in the subscriber's account), the prepaid server 48 does not have the destination number to which the call is to be extended. The prepaid server 48, therefore, issues a prompt to the user to re-enter the called number, at step 206. Because a PTT call was initiated while the mobile station is roaming off-net, the mobile station resident PTT client program 74 causes the mobile station 13 to display a menu item or soft-key icon on the display 69, which the user selects at step 208. Based on the user response, the mobile station resident PTT client program 74 then causes the mobile station 13 to send the contact number information by sending DTMF signals to the prepaid server at step 210.

The transmitted information contains the selected contact's alias number. The prepaid server 48 extends the call to the PTT SSS 49 at step 212. The PTT SSS 49 identifies the destination directory number from the active PTT directory database by correlating the alias contact number with the contact list table corresponding to the caller ID information of mobile station 13, at step 214. At step 216, the call is extended to the destination directory number location, e.g. through the network 40 toward the Home MSC of the PTT mobile station 17 belonging to the contact selected at step 200.

Figure 4B:
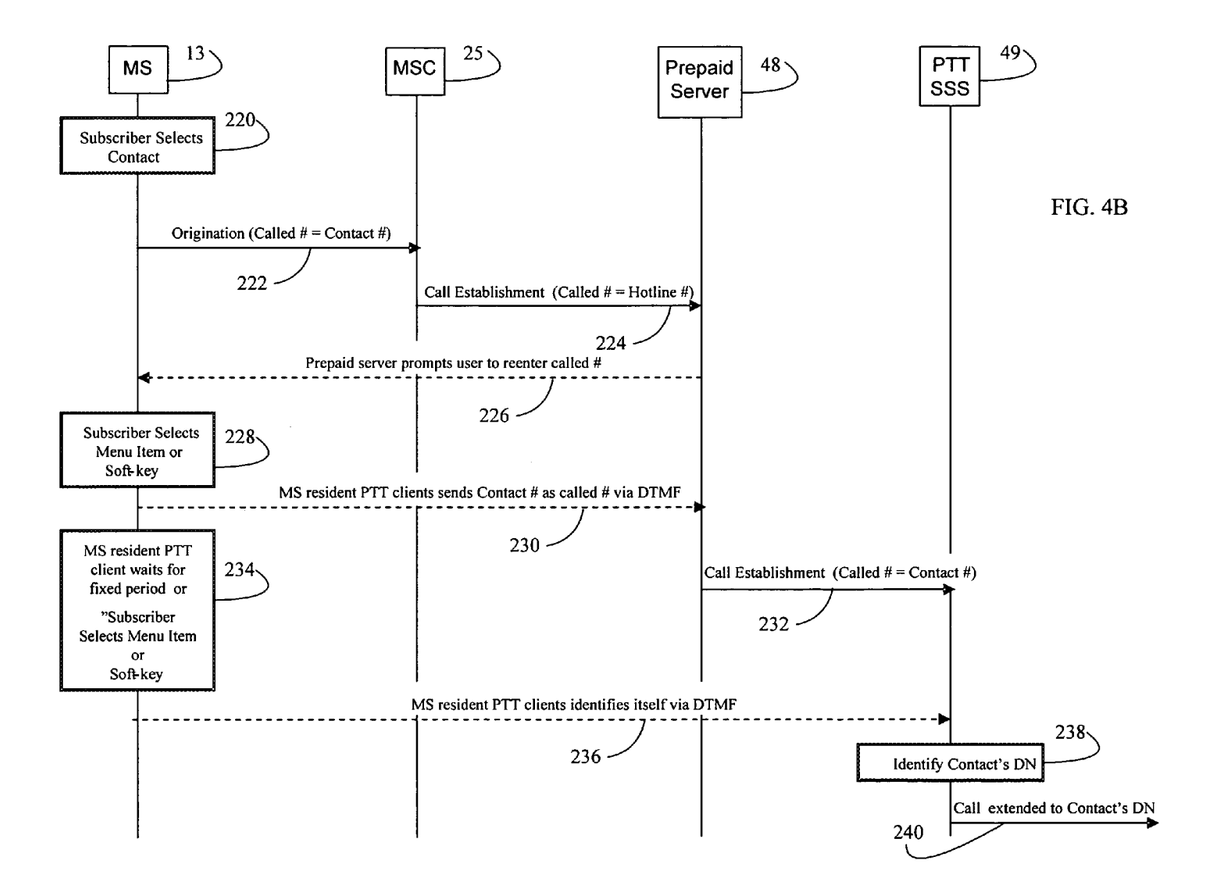

FIG. 4B is a signal flow diagram of a process for establishing a PTT call originating from an off-net subscriber, in this example, where for security reasons the PTT SSS 49 relies on the PTT client to identify the calling subscriber by transmitting a "calling station ID" distinct from caller ID as DTMF signaling. At step 220, the user selects an entry from contact list displayed by the resident PTT client program 74 in response to actuation of the PTT button 101. In response, the resident PTT client program 74 originates a call, transmitting the contact number to the serving MSC 25 at step 222. The serving MSC 25 recognizes that the call is being originated by a "hotlined subscriber" from information retrieved from the subscriber's home location register during registration, and it "hotlines" the call to the home carrier's prepaid server 48, at step 224. For such routing, the originally dialed contact number is replaced with prepaid server number (which is the "hotline number"). At this point, the prepaid server does not have the destination number to which the call is to be extended. The prepaid server 48, therefore, issues a prompt to the user to re-enter the called number, at step 226. Because a PTT call was initiated while the mobile station is roaming off-net, the mobile station resident PTT client program 74 causes the mobile station 13 to display a menu item or soft-key icon, which the user selects at step 228. Based on the user response, the mobile station resident PTT client program 74 then causes the mobile station 13 to send the selected contact's alias number as DTMF signals to the prepaid server 48 at step 230. The prepaid server extends the call to the PTT SSS 49 at step 232.

At step 234, the mobile station resident PTT client program 74 sets a delay period beginning upon transmission of the contact number from the mobile station 13 to the prepaid server 48. The delay period should be of sufficient duration to establish the call connection to the PTT. SSS 49. The mobile station 13, at the end of the delay period, may automatically dial out DTMF signals that identify the calling station or may display a soft menu item or soft key icon for selection by the user to activate transmission of the DTMF signals. As another alternative, the mobile station may display the identification information to the user and send the appropriate DTMF signals through the network in response to user input of the identification information via the keypad 67. The DTMF calling station identification signals are transmitted to the PTT SSS 49 at step 236. At step 238, the PTT SSS 49 identifies the destination directory number from the active PTT directory database by correlating the alias contact number with the contact list table corresponding to the calling station ID information. At step 240, the call is extended toward the Home MSC of the destination directory number.

As shown by the above discussion, aspects of the technology disclosed herein relate to a PTT client program controlling operations of the mobile station for PTT calls through the network, where the program is configurable to selectively operate the mobile station in a prepaid mode or a postpay mode in accord with a flag or other configuration setting established in response to a command received via the network, i.e. based on the payment arrangement that the subscriber has with the service provider. The configuration setting may be changed from time to time, as the customer changes subscription arrangements with the provider. PTT client operations described above may be carried out by execution of programming code in the form of software, firmware, or microcode running on microprocessors or other controllers of mobile stations. The client software functionalities involve programming, including executable code as well as associated stored data, for causing the mobile station to implement the PTT related functions, as exemplified by the discussions above. Code for implementing the PTT client program may be in the form of computer instruction in any form (e.g. source code, object code, interpreted code, etc.) stored in or carried by any computer or machine-readable medium. In operation, the executable code is stored within the respective mobile station. At other times, however, the programming may be stored at other locations and/or transported for loading into respective equipment, e.g. into the particular mobile station from a server or the like.

Hence, implementations of the teachings presented herein typically involve one or more software products in the form of one or more modules of executable code and/or data serving as the PTT client program carried by at least one machine readable medium. Execution of such code by a processor or the like of a mobile station causes the station for example to implement steps such as outlined above in the discussion of the PTT call flows of FIG. 3 or FIG. 4, to support PTT communications of a prepaid subscriber while roaming. Of course, the operation of the PTT client program in a postpay mode (with the flag set for postpay rather than prepaid) would lead to operation of the mobile station in a normal manner for PTT operations.

As used herein, terms such as computer or machine "readable medium" refer to any medium that participates in providing instructions and/or data to a processor. Such a medium may take many forms, including but not limited to, non-volatile media, volatile media, and transmission media. Non-volatile media include, for example, flash memory 73 of the mobile station 13 of FIG. 2, as well as optical or magnetic disks in any server or computer(s), switches or routers that may be used to store programming for downloading into mobile stations. Volatile media include dynamic memory, such as RAM 75 in the mobile station 13 or main memory of a computer platform or of a program server. Physical transmission media include coaxial cables; copper wire and fiber optics, including the wires that comprise a bus within a computer system/server. Carrier-wave transmission media can take the form of electric or electromagnetic signals, or light waves, such as those generated during radio frequency (RF) and infrared (IR) data communications over wireline and wireless links of the network. Many of these forms of computer readable media may be involved in carrying one or more sequences of one or more instructions to a processor for storage and/or execution, for example for downloading into a mobile station.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for processing a prepaid push-to-talk (PTT) call for a mobile telephone station, the method comprising the steps of:
    generating a calling signal from the mobile telephone station for initiating a PTT call through a mobile communication network;
    when the call is initiated at an off-net roaming location, directing the call to a prepaid server platform;
    prompting a resident client program in the mobile telephone station to transmit information to the prepaid server platform; and
    transmitting contact member information to the prepaid server platform by the resident client program, in response to the prompting.

2. The method as recited in claim 1, wherein:
    the resident client program is selectably settable in a prepaid mode of operation and a postpay mode of operation;
    the method further comprises a step of setting a flag in the mobile telephone station indicating that the subscriber of the mobile telephone station is a prepaid subscriber, to set the resident client program in the prepaid mode; and
    the step of transmitting the information to the prepaid server platform by the resident client program in response to the prompting step, is controlled by the resident client program when set in the prepaid mode of operation based on the flag indicating that the mobile station is a prepaid subscriber station.

3. The method as recited in claim 2, wherein the step of setting the flag comprises:
    receiving a command directed to the mobile station via the mobile communication network; and
    setting the flag to indicate that the subscriber of the mobile telephone station is a prepaid subscriber responsive to the received command.

4. The method as recited in claim 1, further comprising displaying a contact list, wherein:
    the step of generating the calling signal is responsive to a user selection of the contact from the displayed contact list; and
    the contact number information transmitted to the prepaid server platform by the resident client program corresponds the user selected contact.

5. The method as recited in claim 4, further comprising the step of transmitting identity of the mobile station to the PTT switch.

6. The method as recited in claim 5, wherein the step of transmitting identity of the mobile station to the PTT switch comprises transmitting DTMF digit signals representing the identity of the mobile station, from the mobile station through the mobile communication network to the PTT switch.

7. The method as recited in claim 4, further comprising the steps of:
    extending the call from the prepaid server platform to a PTT switch responsive to the contact number information; and
    establishing a circuit-switched PTT communication for the call from the PTT switch to a terminal based on the contact number information.

8. The method as recited in claim 7, further comprising:
    displaying a softkey as a prompt to the user;
    wherein the step of transmitting the contact number information to the prepaid server platform is responsive to user selection of the displayed softkey.

9. The method as recited in claim 7, further comprising:
    displaying the contact number to the user;
    wherein the step of transmitting the contact number information to the prepaid server platform is responsive to receiving a user input of the contact number based on the display of the contact number.

10. The method as recited in claim 7, further comprising the step of transmitting identity of the mobile station to the PTT switch.

11. The method as recited in claim 10, further comprising:
    displaying a softkey as a prompt to the user;
    wherein the step of transmitting identity of the mobile station is responsive to user selection of the displayed softkey.

12. The method as recited in claim 11, wherein the step of transmitting identity of the mobile station to the PTT switch comprises transmitting DTMF digit signals representing the identity of the mobile station, from the mobile station through the mobile communication network to the PTT switch.

13. The method as recited in claim 10, further comprising:
    displaying the identity of the mobile station to the user;
    wherein the step of transmitting identity of the mobile station comprises:

receiving a user input of the identity of the mobile station based on the display; and transmitting the user input identity of the mobile station to the PTT switch.

14. The method as recited in claim 13, wherein the step of transmitting identity of the mobile station to the PTT switch comprises transmitting DTMF digit signals representing the identity of the mobile station, from the mobile station through the mobile communication network to the PTT switch.

15. The method as recited in claim 10, wherein the step of transmitting identity of the mobile station is responsive to expiration of a predetermined time interval after the contact number information has been sent to the prepaid server platform.

16. The method as recited in claim 15, wherein the step of transmitting identity of the mobile station to the PTT switch comprises transmitting DTMF digit signals representing the identity of the mobile station, from the mobile station through the mobile communication network to the PTT switch.

17. A method for processing a prepaid push-to-talk (PTT) call for a mobile telephone station, the method comprising the steps of:

generating a calling signal from the mobile telephone station for initiating a PTT call through a mobile communication network;

when the call is initiated at an off-net roaming location, directing the call to a prepaid server platform;

extending the call from the prepaid platform toward a PTT switch;

determining a point in the PTT call at which the PTT call is expected to have reached a PTT switch;

at said point in the PTT call, prompting the user; and responsive to a user input following the prompting, transmitting identity of the mobile station via the wireless transceiver and the network, for communication to the PTT switch.

18. The method as recited in claim 17, wherein the step of determining the point in the PTT call comprises detecting expiration of a predetermined time interval after PTT contact information has been sent from the mobile telephone station to the prepaid server platform.

19. The method as recited in claim 17, wherein:

the step of prompting comprises displaying a softkey to the user, via a user interface of mobile telephone station, at said point in the PTT call; and the step of transmitting the identity of the mobile telephone station responsive to user input comprises automatically transmitting the identity of the mobile station in response to user activation of the softkey via the user interface of the mobile telephone station.

20. The method as recited in claim 17, wherein:

the step of prompting comprises displaying the identity of the mobile station to the user via a user interface of mobile telephone station; and the step of transmitting the identity of the mobile station comprises transmitting a subsequent user input of the displayed identity of the mobile station to the PTT switch.

21. The method as recited in claim 17, wherein the step of transmitting the identity of the mobile station comprises transmitting DTMF digit signals representing the identity of the mobile station to the PTT switch.

22. A mobile station for use in a mobile communication network, comprising:

a wireless transceiver for communication via the network;

a programmable controller coupled to the transceiver for controlling operation of the mobile station;

a user interface coupled to the programmable controller to enable a user of the mobile station to receive data and provide input to the programmable controller; and a memory coupled to the controller;

a push-to-talk (PTT) client program stored in the memory, wherein:

execution of the PTT client program by the controller causes the controller to control operation of the mobile station so as to perform one or more communications via the network for a PTT call;

the PTT client program is selectably configurable to implement the communications for PTT calls in a prepaid mode and a postpay mode; and at least one operation of the mobile station in relation to communication via the network for a PTT call, when the mobile station is roaming off-net, differs between the prepaid mode and the postpay mode.

23. The mobile station as recited in claim 22, wherein execution of the PTT client program by the controller in the prepaid mode causes the mobile station to perform functions when the mobile station is roaming off-net, comprising:

(a) retrieving contact number information for at least one contact from a contact list stored in the memory, responsive to a user activation;

(b) generating a calling signal for initiating PTT communication via the network;

(c) displaying a softkey to the user that the user can activate when the user receives a prompt from a prepaid server platform via the network instructing the user to re-enter the called number; and (d) responsive to user activation of the softkey, transmitting a signal comprising the contact number information via the network to the prepaid server platform.

24. The mobile station as recited in claim 22, wherein execution of the PTT client program by the controller in the prepaid mode causes the mobile station to perform functions when the mobile station is roaming off-net, comprising:

(a) retrieving contact number information for at least one contact from a contact list stored in the memory, responsive to a user activation;

(b) generating a calling signal for initiating PTT communication via the network;

(c) displaying the contact list to the user, via the user interface, when the user receives a prompt from a prepaid server platform via the network instructing the user to re-enter the called number; and (d) in response to a user selection from the displayed contact list, via the user interface, transmitting a signal comprising the contact number information via the network to the prepaid server platform.

25. The mobile station as recited in claim 22, wherein execution of the PTT client program by the controller in the prepaid mode causes the mobile station to perform functions when the mobile station is roaming off-net, comprising:

(a) retrieving contact number information for at least one contact from a contact list stored in the memory, responsive to a user activation;

(b) generating a calling signal for initiating PTT communication via the network;

(c) displaying the contact number to the user, via the user interface, when the user receives a prompt from a prepaid server platform via the network instructing the user to re-enter the called number; and (d) in response to a user input of a contact number via the user interface based on the display, transmitting a signal comprising the input contact number via the network to the prepaid server platform.

26. The mobile station as recited in claim 22, wherein execution of the PTT client program by the controller in the prepaid mode causes the mobile station to perform functions when the mobile station is roaming off-net, comprising:
  (a) determining a point in the PTT call at which the PTT call is expected to have reached a PTT switch;
  (b) at said point in the PTT call, prompting the user; and
  (c) responsive to a user input following the prompting, transmitting identity of the mobile station via the wireless transceiver and the network, for communication to the PTT switch.

27. The mobile station as recited in claim 26, wherein the function of determining the point in the PTT call comprises detecting expiration of a predetermined time interval after PTT contact information has been sent to a prepaid server platform handling the PTT call.

28. The mobile station as recited in claim 26, wherein:
  the function of prompting comprises displaying a softkey to the user, via the user interface, at said point in the PTT call; and
  the function of transmitting the identity of the mobile station responsive to user input comprises automatically transmitting the identity of the mobile station in response to user activation of the softkey.

29. The mobile station as recited in claim 26, wherein:
  the function of prompting comprises displaying the identity of the mobile station to the user; and
  the function of transmitting the identity of the mobile station comprises transmitting the user input of the displayed identity of the mobile station to the PTT switch.

30. The mobile station as recited in claim 26, wherein the function of transmitting the identity of the mobile station comprises transmitting DTMF digit signals representing the identity of the mobile station to the PTT switch.

31. The mobile station as recited in claim 22, wherein the memory stores a flag for setting the PTT client program to a selected one of the prepaid and postpay modes.

32. The mobile station as recited in claim 26, wherein the controller is configured to program the flag to set the PTT client program in the prepaid mode in response to a command received via the network.

33. A mobile communication network for providing push-to-talk (PTT) communication service, comprising:
  a radio access network for providing wireless communications, at least for a plurality of PTT mobile stations;
  a PTT service specific switch (PTT SSS), coupled to the radio access network, for establishing circuit switched communications with mobile stations for PTT communication sessions;
  a prepaid server for managing prepaid accounts and monitoring communications in accord with the prepaid accounts, for PTT mobile stations of prepaid subscribers; and
  PTT client programs stored in said PTT mobile stations for controlling PTT communications of said PTT mobile stations, each PTT client program being configurable to cause a respective PTT mobile station to operate in a selected one of a prepaid mode and a postpay mode, wherein at least one operation of the respective mobile station in relation to communications via the network for a PTT call, when the respective mobile station is roaming off-net, differs between the prepaid mode and a postpay mode; and
  means for communicating via the radio access network for setting flags in the PTT mobile stations of prepaid subscribers to configure the PTT client programs in the PTT mobile stations of prepaid subscribers to cause the PTT mobile stations of prepaid subscribers to operate in the prepaid mode.

34. The system as recited in claim 33, wherein:
  the means for communicating comprises a PTT administration system for configuring one or more elements of the system to support PTT calls; and
  the PTT administration system is configured for sending a command via the radio access network for setting the flag in each respective one of the PTT mobile stations of prepaid subscribers.

35. The system as recited in claim 34, wherein the PTT SSS receives the commands from the PTT administration system and communicates the commands via the radio access network to the PTT mobile stations of prepaid subscribers.

36. The system as recited in claim 33, wherein the PTT administration system sends the commands in response to instructions regarding the prepaid subscribers from a system operator's provisioning system.

37. A product comprising: a machine readable medium, and a push-to-talk (PTT) client program for a mobile station embodied in the medium, wherein:
  execution of the PTT client program by a controller of the mobile station causes the controller to control operation of the mobile station so as to perform one or more communications via a mobile communication network for a PTT call,
  the PTT client program is selectably configurable to implement the communications for PTT calls in a prepaid mode and a postpay mode;
  at least one operation of the mobile station in relation to communication via the network for a PTT call, when the mobile station is roaming, differs between the prepaid mode and the postpay mode; and
  operation of the mobile station in relation to communications via the network for a PTT call program, when the mobile station is roaming, in the prepaid mode comprises:
    retrieving contact number information for at least one contact from a contact list stored in the mobile station, responsive to a user activation;
    generating a calling signal containing the contact number information, for initiating push-to-talk (PTT) communication via the network;
    displaying a softkey to the user that the user can activate when the user receives a prompt from a prepaid server platform via the network instructing the user to re-enter the called number; and
    responsive to user activation of the softkey, transmitting a signal comprising the contact number information through the network to the prepaid server platform.

38. The product of claim 37, wherein the PTT client program comprises a flag, a state of which sets the PTT client program to operate the mobile station in a selected one of the prepaid mode and the postpay mode.

39. The product of claim 37, wherein the PTT client program enables setting of the flag in response to a command received in the mobile station via the mobile communication network.

* * * * *